Figure 1:
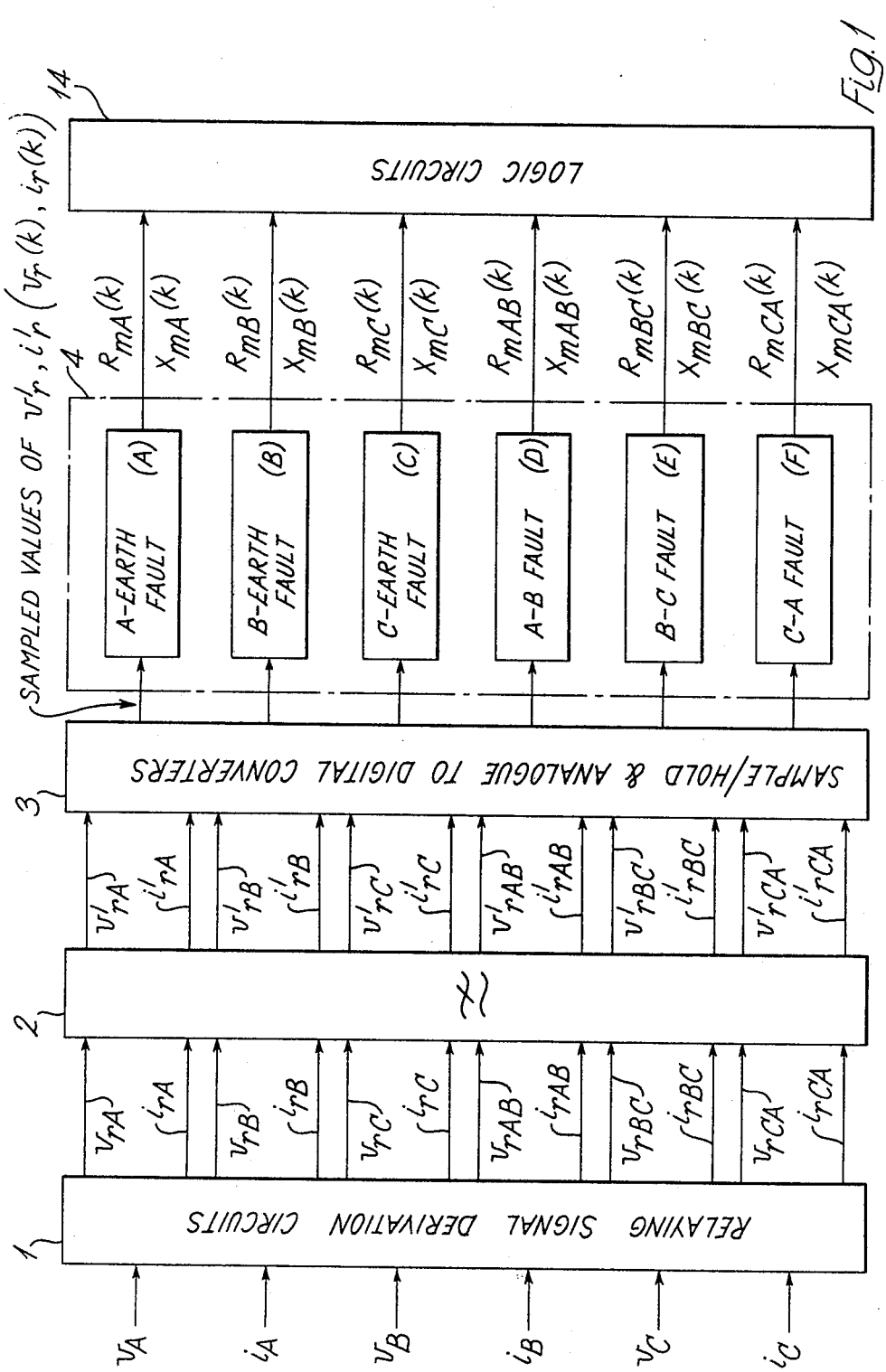

United States Patent [19]

Johns et al.

[11] 4,261,038

[45] Apr. 7, 1981

[54] PROTECTION OF ELECTRICAL POWER SUPPLY SYSTEMS

[75] Inventors: Allan T. Johns, Corsham; Michael A. Martin, Bradford-on-Avon, both of England

[73] Assignee: National Research Development Corporation, London, England

[21] Appl. No.: 15,439

[22] Filed: Feb. 26, 1979

[30] Foreign Application Priority Data

Feb. 28, 1978 [GB] United Kingdom ............... 07810/78

[51] Int. Cl.³ .................... G06F 15/32; G06F 15/332; H02H 3/26
[52] U.S. Cl. .................................... 364/482; 324/52; 361/79; 364/551; 364/576
[58] Field of Search ............... 364/482, 483, 551, 576; 340/646, 653, 661, 664; 361/44, 79, 80, 88, 93; 324/51, 52

[56] References Cited

U.S. PATENT DOCUMENTS

| | | | |
|---|---|---|---|
| 3,885,199 | 5/1975 | Nohara et al. | 361/79 |
| 3,904,859 | 9/1975 | Poncelet | 364/482 |
| 3,984,737 | 10/1976 | Okamura et al. | 361/80 |

FOREIGN PATENT DOCUMENTS 1476645  6/1977  United Kingdom ............... 364/483

Primary Examiner—Jerry Smith
Attorney, Agent, or Firm—Cushman, Darby & Cushman

[57] ABSTRACT

An electrical power fault protection relay operates when the calculated impedance of the section of the system it protects shows a sudden change. The instantaneous voltage and current is measured. A calculation device then calculates the Fourier transform of a window of the actual voltage and current over a time interval and of the modified current that would flow if the voltage on each side of the time interval was zero. The actual impedance is calculated from the ratio of the Fourier transforms of the actual voltage and the modified current.

5 Claims, 3 Drawing Figures

PROTECTION OF ELECTRICAL POWER SUPPLY SYSTEMS

This invention relates to protection arrangements for electrical power supply systems of the type which operate by detecting changes in impedance levels.

In electrical power transmission and distribution systems, it is customary for each end of each section of the system, such as a transformer, a power line and the like, to be provided with a protective device which disconnects its associated section if a fault occurs therein. It is, of course, important for disconnection to take place only if the fault occurs within the section being protected and not if a fault occurs in some other section.

Protection devices of this type are based on measuring, from a knowledge of the variation of the voltages and currents in each phase at a measuring point, the impedance presented to a protective relay. Under fault conditions, the impedance measured generally differs from that under no-fault conditions and it is possible to use this fact to trip one or more poles of circuit breaker if a system fault develops.

Impedance is only meaningful when related to steady-state sinusoidal conditions. In the interval immediately following a fault (typically one cycle of power frequency after fault inception), the waveforms derived from the section containing the fault contain a variety of transients which vary according to the power system operating conditions and configuration.

One consequence of the use of increasingly high voltages in transmission systems has been to increase the fault currents which can be produced and therefore reduce the maximum acceptable fault clearance time. It is therefore desirable to provide a protection arrangement which can operate using information derived during one cycle after fault inception. An arrangement of this type is disclosed in U.K. Specification No. 1,476,645. This system operates by detecting travelling waves produced on occurrence of a fault. However, when the instant of fault inception occurs near zero voltage of the power waveform, the travelling wave produced is relatively small and difficult to detect.

According to the present invention, apparatus for detecting the occurrence of a fault in a section of an electrical power distribution system comprises means for measuring the instantaneous values of the voltage and current at a predetermined location in said section, means for calculating an approximation to the Fourier transform of a window of the actual voltage waveform over a predetermined interval of time, means for calculating an approximation to the Fourier transform of a window of the actual current waveform over said predetermined time interval, means for calculating an approximation to the Fourier transform of the modified current which would flow if the voltage on each side of the time interval was zero, and means for calculating the actual impedance of the section from said Fourier transform of the actual voltage and the modified current.

Preferably the means for calculating the impedance includes means for calculating the fault resistance, which is, of course, concentrated at the location of the fault, separately from the impedance of the section which is distributed over the entire length of the section, particularly if the section is a transmission line.

Preferably the duration of the time interval over which the Fourier transforms are calculated is greater than one quarter of a cycle of the power waveform. The frequency at which the impedance is determined is preferably equal to the power frequency.

The mathematical background to the invention is as follows. If $Z(p)$ is the impedance of a transmission line containing a fault and $v_r$ and $i_r$ are the instantaneous values of voltage and current at a particular point in the transmission line, for example at one end thereof, the operational relationship of Equation 1 applies irrespective of the waveform of voltage and current.

$$v_r = Z(p) i_r \qquad (1)$$

If the voltage $v_r$ is considered as a summation of an arbitrary number of components $$v_r = \sum_{n}^{k=1} v_{rk},$$

superposition can be used to relate the total post-fault current $$i_r = \sum_{n}^{k=1} i_{rk}$$

to the components of current which would flow in response to the separate application of the assumed voltage component. Each of the components is related by an equation of the form of Equation 1 so that in the case of the second component of voltage and current, Equation 2 applies $$v_{r2} = Z(p) i_{r2} \qquad (2)$$

Equation 2 can be transferred into the frequency domain by means of the Fourier integral, and when this is done we obtain $$v_{r2}(j\omega) = Z(j\omega) i_{r2}(j\omega) \qquad (3)$$

where $$v_{r2}(j\omega) = \int_{-\infty}^{\infty} v_{r2} \exp(-j\omega t) dt$$

$$i_{r2}(j\omega) = \int_{-\infty}^{\infty} i_{r2} \exp(-j\omega t) dt$$

and $$j = \sqrt{-1}$$

$Z(j\omega)$ represents the fault loop impedance at any frequency of interest. It follows that if components of $v_{r2}(j\omega)$ and $i_{r2}(j\omega)$ are determined for any particular angular frequency of interest ($\omega_e$), the fault loop impedance at this frequency can be obtained from an equation of the form of Equation 4.

$$Z(j\omega_e) = v_{r2}(j\omega_e)/i_{r2}(j\omega_e) \qquad (4)$$

The foregoing method enables a measurement of the impedance appearing at the point of fault to be effected at any chosen frequency, and the method is fundamentally independent of the waveforms from which measurements are made. If a voltage component $v_{r2}$, equal to the actual relaying voltage $v_r$ for all time inside a time interval $T_1 \leq t \leq T_2$ and zero outside is considered, then $v_{r2}(j\omega_e)$ is given by Equation 5.

$$v_{r2}(j\omega_e) = \overline{v}_{r2}(j\omega_e) = \int_{T_1}^{T_2} v_r \exp(-j\omega_e t) dt \tag{5}$$

There is no direct method of determining the component $i_{r2}(j\omega_e)$ but because current is a causal function of voltage, the total current in the interval $T_1 \leq t \leq T_2$ is the result of only the voltage components $v_{r1}$ and $v_{r2}$. Accordingly it can be shown that the current $i_{r2}$ is given by Equation 6 for $T_1 \leq t \leq T_2$ and by Equation 7 for $T_2 \leq t \leq \infty$ $$i_{r2} = i_r - i_r(T_1) \exp\{-(t - T_1)/\tau\} - f_{h1}(t) \tag{6}$$

$$i_{r2} = \{i_r(T_2) - i_r(T_1) \exp(-[T_2 - T_1]/\tau) - f_{h1}(T_2)\} \exp(-\{t - T_2\}/\tau + f_{h2}(t) \tag{7}$$

where $\tau = L/R$

L = effective inductance per unit-length of line and
R = effective resistance per unit-length of line The functions $f_{h1}(t)$, $f_{h2}(t)$ account for the high frequency current components which can be shown to be small and many orders removed from power frequency on transmission lines less than 250 km. in length. When taking the transform of Equations 6 and 7, the existence of high frequency components can therefore be neglected provided an extraction frequency $\omega_e$ close to the power frequency value is chosen. In such a case the component $i_{r2}(j\omega_e)$ is given by Equation 8.

$$i_{r2}(j\omega_e) \simeq \overline{i}_r(j\omega_e) - \tau\{i_r(T_1) \exp(-j\omega_e T_1) - i_r(T_2) \exp(-j\omega_e T_2)\}/\{1 + j\omega_e\} \tag{8}$$

where $\overline{i}_r(j\omega_e) = \int_{T_1}^{T_2} i_r \exp(-j\omega_e t) dt$

Equations 3, 5 and 8 can be combined to give Equation 9 which in turn forms the basis of the algorithm used for determining the fault loop impedance.

$$Z(j\omega_e) \simeq \overline{v}_r(j\omega_e)/(\overline{i}_r\{j\omega_e\} - \tau \overline{u}/\{1 + j\omega_e \tau\}) \tag{9}$$

where $\overline{u} = (i_r\{T_1\} \exp\{-j\omega_e T_1\} - i_r\{T_2\} \exp\{-j\omega_e T_2\})$ In practice, some faults encountered will involve significant resistance at the point of fault and for general application it is therefore necessary to modify the algorithms so as to take account of such effects. It can be shown that the fault resistance component, as measured from a particular relaying point, can be determined from Equation 10.

$$R_f \simeq \frac{Im\ \overline{v}_r\{j\omega_e\}/\overline{w}}{Im\ \overline{i}_r\{j\omega_e\}/\overline{w}} \tag{10}$$

where $$\overline{w} = (\{1 + j\omega_e \tau\} \ \overline{i}_r \ \{j\omega_e\} - \tau \overline{u}) \text{ and } Im$$

means "the imaginary part of". The total impedance is then determined from Equation 11.

$$Z(j\omega_e) \simeq \frac{\overline{v}_r(j\omega_e) - R_f \overline{\tau u}/(1 + j\omega_e \tau)}{\overline{i}_r(j\omega_e) - \tau \overline{u}/(1 + j\omega_e \tau)} \tag{11}$$

Equation 11 can be rearranged in the form of Equation 12, $$\omega_e L_m = X_m \simeq \frac{\overline{v}_r(j\omega_e) - R_m \overline{i}_r(j\omega_e)}{j\overline{i}_r(j\omega_e) - \overline{u}/\omega_e} \tag{12}$$

where $R_m$ and $X_m$ are the measured resistance and reactance of the circuit respectively, $i_r(T_1)$ and $i_r(T_2)$ are the instantaneous values of relaying current at times $T_1$ and $T_2$ respectively, and $$\overline{u} = i_r(T_1) \exp(-j\omega_e T_1) - i_r(T_2) \exp(-j\omega_e T_2)$$

The relationship of the measured resistance and reactance ($R_m$, $X_m$), as obtained from Equation 12, to the parameters of the primary system depends on the relaying measurands $v_r$, $i_r$. In the case of measurements pertaining to pure phase faults, the relaying voltages and currents are derived as the difference of phase quantities and the measured impedance relates to the positive phase sequence fault loop impedance. For pure earth faults the appropriate phase to earth voltage is used in conjunction with a measure and proportional to a combination of the current in all three phases and the measured impedance relates to the positive phase sequence or self impedance of the loop.

Figure 2:
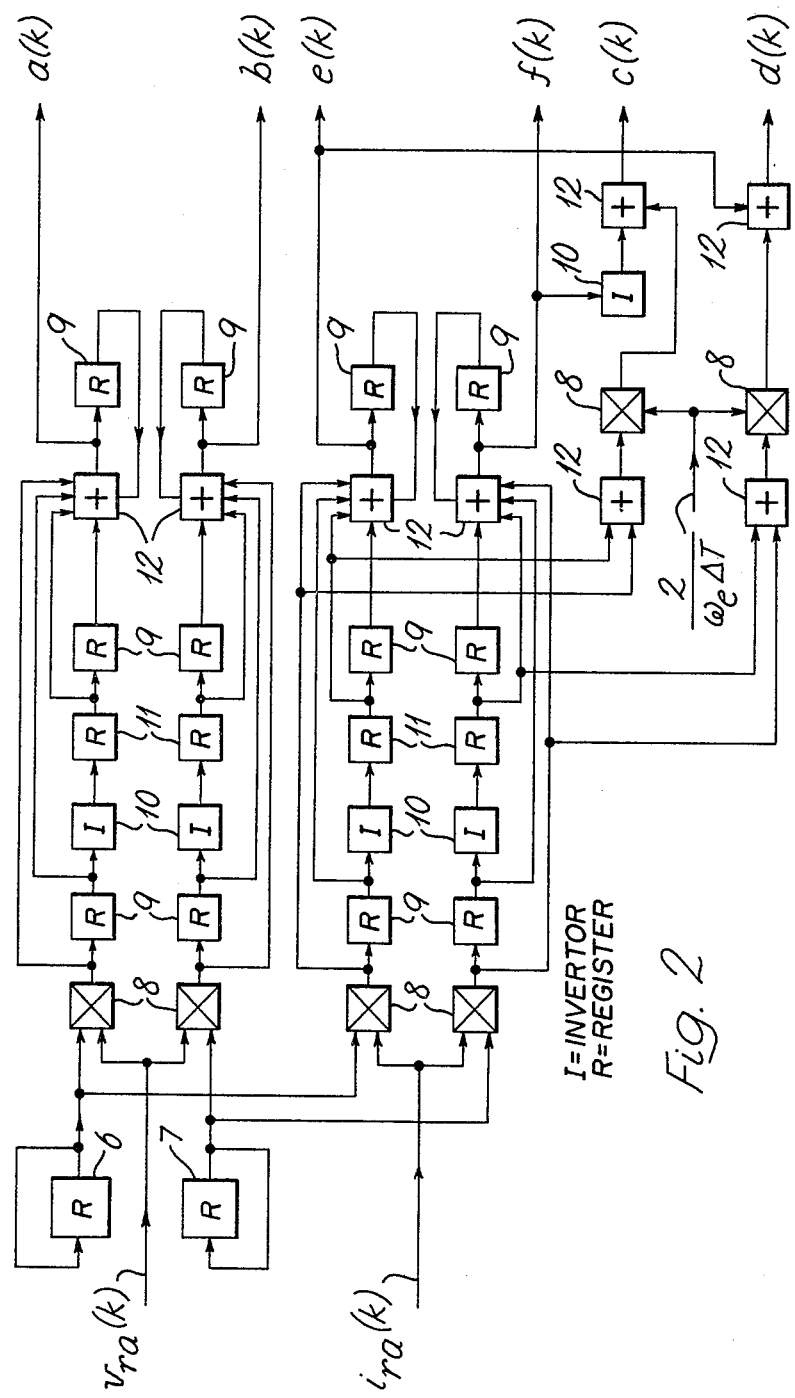
Figure 3:
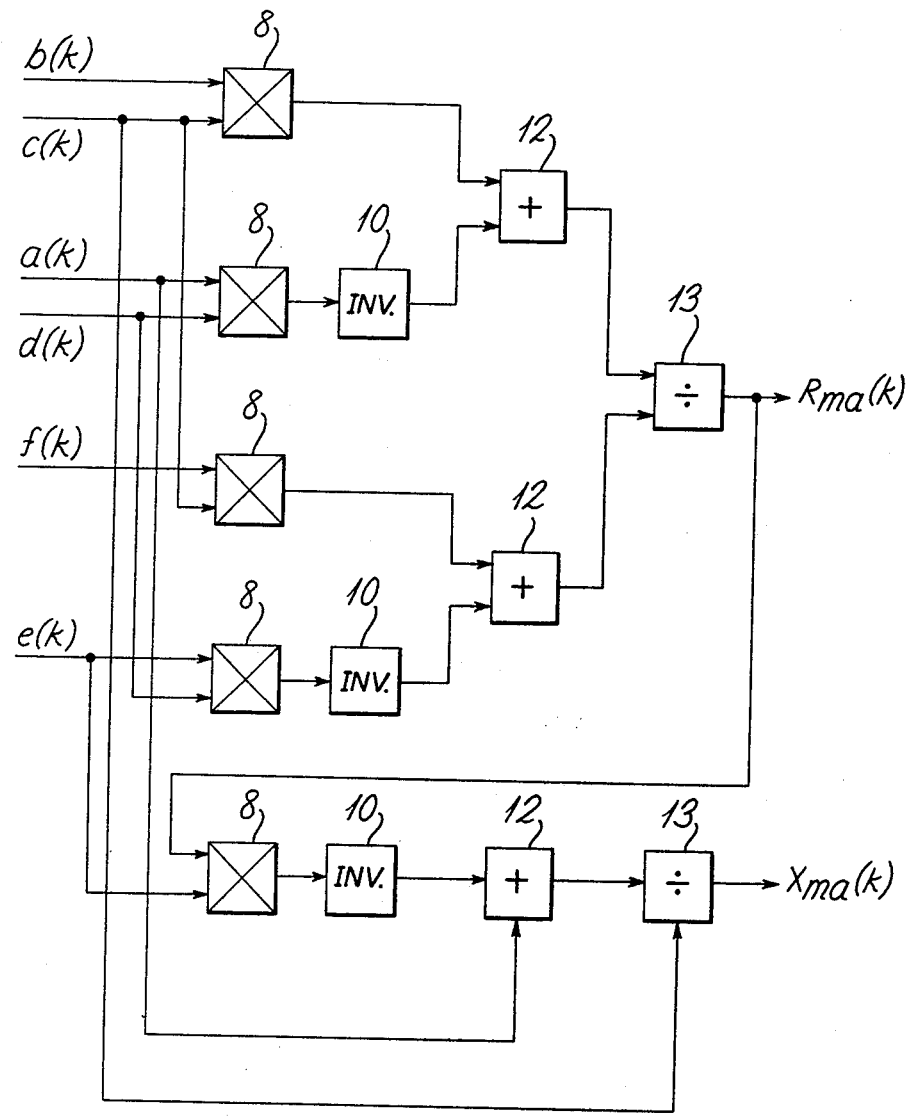

An embodiment of the invention will now be described, by way of example, with reference to the accompanying drawings, in which:

FIG. 1 is a schematic diagram of a fault detection system in accordance with the invention, and FIGS. 2 and 3 together form a block diagram illustrating one of the components of the system shown in FIG. 1 in more detail.

A fault detection system in accordance with the invention is shown in FIG. 1. Three signals $v_A$, $v_B$ and $v_C$, proportional to the system phase-earth voltages are derived from voltage transformers situated at the measuring point, and three current signals $i_A$, $i_B$ and $i_C$, proportional to the current in each phase and derived from current transducers situated at the measuring point, are applied to a relaying signal derivation circuit unit 1. This unit 1 consists of a number of current shunts and mixing transformers arranged to produce six pairs of voltage signals $v_{rA}$ and $i_{rA}$, $v_{rB}$ and $i_{rB}$, $v_{rC}$ and $i_{rC}$, $v_{rAB}$ and $i_{rAB}$, $v_{rBC}$ and $i_{rBC}$, $v_{rCA}$ and $i_{rCA}$, each pair corresponding to the voltage and current due to a respective one of the three principal phase to earth faults and three principal inter-phase faults. These six pairs of signals are passed through low-phase filters 2, the outputs $v'_{rA}$ and $i'_{rA}$, $v'_{rB}$ and $i'_{rB}$, $v'_{rC}$ and $i'_{rC}$, $v'_{rAB}$ and $i'_{rAB}$, $v'_{rBC}$ and $i'_{rBC}$, $v'_{rCA}$ and $i'_{rCA}$ of which, are passed to a unit 3 comprising a sample/hold multiplex and analog to digital converter circuit. The unit 3 provides digital signals, corresponding to samples of each filtered relaying signal component at a rate of $1/\Delta T$ samples per second, each set of digital signals being passed to a respective one of six signal measuring units 4 covering the six principal fault types. $\Delta T$ may be about one thousandth of a second.

The six measuring units 4 are of essentially identical construction, each effecting an implementation of Equation 12. It can be shown from Equation 12 that the values of measured resistance and reactance can be obtained from Equations 13 and 14 respectively.

$$R_m = (bc - ad)/(fc - ed) \quad (13)$$

$$X_m = (a - R_m e)/c \quad (14)$$

where $$a + jb = \frac{2}{\Delta T} \overline{v_r}(j\omega_e)$$

$$c + jd = \frac{2}{\Delta T} \overline{y}(j\omega_e)$$

$$e + jf = \frac{2}{\Delta T} \overline{i_r}(j\omega_e) \text{ and}$$

$$\overline{y}(j\omega_e) = j\overline{i_r}(j\omega_e) + \{i_r(T_2) \exp(-j\omega_e T_2) - i_r(T_1) \exp(-j\omega_e T_1)\}/\omega_e$$

The values a, b, c, d, e and f are given by the integral expressions given in Equations 15 to 20.

$$a = \frac{2}{\Delta T} \int_{T_1}^{T_2} v_r \cos\omega_e t \, dt \quad (15)$$

$$b = \frac{-2}{\Delta T} \int_{T_1}^{T_2} v_r \sin \omega_e t \, dt \quad (16)$$

$$c = \frac{2}{\Delta T} \left\{ \int_{T_1}^{T_2} i_r \sin\omega_e t \, dt + [i_r(T_2)\cos\omega_e T_2 - i_r(T_1)\cos\omega_e T_1]/\omega_e \right\} \quad (17)$$

$$d = \frac{2}{\Delta T} \left\{ \int_{T_1}^{T_2} i_r \cos\omega_e t \, dt - [i_r(T_2)\sin_e T_2 - i_r(T_1)\sin\omega_e T_1]/\omega \right\} \quad (18)$$

$$e = \frac{2}{\Delta T} \int_{T_1}^{T_2} i_r \cos\omega_e t \, dt \quad (19)$$

$$f = \frac{-2}{\Delta T} \int_{T_1}^{T_2} i_r \sin\omega_e t \, dt \quad (20)$$

The measuring unit 4(A), covering A-phase to earth fault, is shown in more detail in FIGS. 2 and 3. The functions of the various units of FIGS. 2 and 3 are as follows.

The unit 6 is a p+1 stage closed loop storage register which contains, and serially provides at its output, the weighting functions $\cos\omega_e\Delta T$, $\cos 2\omega_e\Delta T$, ... $\cos p\omega_e\Delta T$, 1; where p is an integer equal to $2\pi/\omega_e\Delta T - 1$.

The unit 7 is a p+1 stage closed loop storage register which contains, and serially provides at its output, the weighting functions $-\sin \omega_e\Delta T$, $-\sin 2\omega_e\Delta T$, ... $-\sin p\omega_e\Delta T$, 0; where p is an integer equal to $2\pi\omega_e\Delta T - 1$.

Of the remaining units, the unit 8 is a multiplier, the unit 9 is a single stage storage register, the unit 10 is an inverter circuit, the unit 11 is an $N-1$ stage storage register, the unit 12 is an adder circuit and the unit 13 is a divider circuit.

FIG. 2 shows the first stage of the unit which evaluates the integral expressions of Equations 15 to 20 as a digital summation using the sample values of $v'_r$ and $i'_r$ provided at the output of the unit 3. The time of integration $T_2 - T_1$ is arbitrary and is split into an integer number N of intervals $\Delta T$. The digital circuits shown in FIG. 2 realize a recursive process which continually updates the values of a, b, c, d, e and f at the sampling frequency chosen. For example, the output "a(k)" is based upon a window of the relaying voltage waveform taken for any time $(k-N) \Delta T \leq t \leq k\Delta T$, the integer k representing any $k^{th}$ sample. The whole process is clocked at a frequency $1/\Delta T$, the clock pulse flow lines having been omitted from FIG. 2 for clarity.

The arrangement of the second stage of the measuring unit 4(A) is shown schematically in FIG. 3. In this case also the clock pulse flow lines are not shown, but the processing is synchronized with the incoming sampled values a(k), b(k), c(k), d(k), e(k) and f(k). The process performed by the circuit of FIG. 3 provides values of the measured resistance and reactance as described by Equations 13 and 14 respectively in sampled form ($R_{ma}(k)$, $X_{ma}(k)$) which are continually updated at a frequency of $1/\Delta T$ samples per second.

Referring again to FIG. 1, the sample output values of measured resistance and reactance for each of the six principal fault types, produced by the six units 4, are passed to an impedance monitor and tripping logic unit 14. In the unit 14, each reactance and resistance sample pair is first checked for convergence on stable values to ensure that tripping is not initiated while the circuit impedance is changing during the transition from healthy to faulty conditions and also to improve protective integrity during healthy conditions such as power swings and short duration transient phenomena. When any pair of resistance and reactance values converge to a preset tolerance on stable values, the measured values are compared in tripping logic circuits which check whether the resulting measured impedance lies inside a predetermined area of the measured impedance plane. By varying the tripping logic constraints, it is possible to vary the coverage of the relays on a discrete or continuous basis.

The unit 14 can be arranged to inhibit tripping if very small values of measured reactance and/or resistance are detected. Such conditions can occur during low impedance faults located immediately behind or in front of the relaying point. If desired, an additional multi-stage store, holding pre-fault relaying samples can be used in conjunction with the logic unit 14 and the measuring unit 4, to provide fast clearance of low impedance faults close to the relay location and inside the section being protected.

We claim:

1. Apparatus for detecting the occurrence of a fault in a section of an electrical power distribution system comprising:
    means for measuring the instantaneous values of the voltage and current at a predetermined location;
    means for calculating an approximation to the Fourier transform of a window of the actual voltage waveform over a predetermined interval of time;
    means for calculating an approximation to the Fourier transform of a window of the actual current waveform over said predetermined time interval;
    means for calculating an approximation to the Fourier transform of the modified current which would flow if the voltage on each side of the time interval was zero;

means for calculating the actual impedance of the section from said Fourier transforms of the actual voltage and the modified current;

means for determining whether the actual impedance of the section lies within a predetermined range of impedance values; and means for providing a relay tripping signal when a fault condition is indicated by said determining means.

2. Apparatus as claimed in claim 1 in which the means for calculating the impedance includes means for calculating the fault resistance separately from the impedance of the section.

3. Apparatus as claimed in claim 1 in which the duration of the time interval over which the Fourier transforms are calculated is greater than one quarter of a cycle of the power waveform.

4. Apparatus as claimed in claim 1, 2 or 3 in which the frequency at which the impedance is determined is equal to the power frequency.

5. Apparatus for detecting the occurrence of a fault in a section of an electrical power distribution system comprising:

means for measuring the instantaneous values of the line currents and phase-to-earth voltages at a predetermined location;

a derivation unit for producing a set of pairs of voltage and current signals being the phase-to-earth voltages and currents and the phase-to-phase voltages and currents;

low-pass filter means through which said set of pairs of signals are passed;

an analog-to-digital converter circuit for sampling each of the filtered signals and deriving digital signals therefrom;

a calculator circuit for each of said digital signals, which calculator circuit comprises means for calculating Fourier transforms of said digital signals over predetermined intervals of time so as to derive sampled values of resistance and reactance from said signals; and a comparison circuit in which the sampled resistance and reactance values are compared with a healthy range of values to provide a relay tripping signal if the said values are outside said range.

* * * * *